United States Patent
Kea, Jr. et al.

(10) Patent No.: US 7,966,774 B2
(45) Date of Patent: Jun. 28, 2011

(54) SECURITY SHELTER FOR SMALL PERSONAL TRANSPORTATION VEHICLES

(76) Inventors: Harry E. Kea, Jr., Columbia, SC (US); David B. Kea, Columbia, SC (US); Scott Kea, Chapin, SC (US); George B. Waites, Jr., Arden, NC (US)

( * ) Notice: Subject to any disclaimer, the term of this patent is extended or adjusted under 35 U.S.C. 154(b) by 224 days.

(21) Appl. No.: 12/337,282

(22) Filed: Dec. 17, 2008

(65) Prior Publication Data

US 2009/0307992 A1    Dec. 17, 2009

Related U.S. Application Data

(63) Continuation-in-part of application No. 11/306,978, filed on Jan. 18, 2006, now Pat. No. 7,644,544.

(60) Provisional application No. 61/014,196, filed on Dec. 17, 2007, provisional application No. 60/593,480, filed on Jan. 18, 2005.

(51) Int. Cl.
    *E04B 1/346* (2006.01)
(52) U.S. Cl. ............... 52/66; 52/71; 52/72; 52/79.1
(58) Field of Classification Search ............... 52/66, 19, 52/67, 71, 72, 79.1, 174
See application file for complete search history.

(56) References Cited

U.S. PATENT DOCUMENTS

| | | | | |
|---|---|---|---|---|
| 2,742,674 A * | 4/1956 | Melder | | 52/64 |
| 3,438,158 A * | 4/1969 | Kane | | 52/64 |
| 3,949,528 A * | 4/1976 | Hartger et al. | | 52/79.1 |
| 4,242,846 A * | 1/1981 | Hurd et al. | | 52/71 |
| 4,876,832 A * | 10/1989 | Wasserman | | 52/79.1 |
| 4,894,832 A * | 1/1990 | Colak | | 372/44.01 |
| 4,894,961 A * | 1/1990 | Robbins | | 52/69 |
| 4,982,971 A * | 1/1991 | Marin | | 280/30 |
| 5,507,121 A * | 4/1996 | Taylor | | 52/66 |
| 6,341,451 B1 * | 1/2002 | Morton, Sr. | | 52/64 |
| 6,345,471 B1 * | 2/2002 | Gyllenhammar | | 52/69 |

* cited by examiner

*Primary Examiner* — Basil Katcheves
*Assistant Examiner* — Branon C Painter
(74) *Attorney, Agent, or Firm* — Calhoun Thomas, III; Samuel Alexander Long, Jr.

(57) ABSTRACT

The invention is for an improved security shelter for small personal transportation vehicles. The invention features lockable, weatherproof storage for such vehicles as motorcycles, bicycles, four wheelers, and Segways®. It is lightweight and can be efficiently manufactured. Vents are optimally located to allow the release of vapor and heat. A lid is hinged to the top such that it can be easily raised or lowered by the user for the purpose of parking a vehicle. Moreover, strategic placement of structural molded ridges and structural flanges in the various components of the invention adds to the overall stability and rigidity of the apparatus.

17 Claims, 10 Drawing Sheets

US 7,966,774 B2

SECURITY SHELTER FOR SMALL PERSONAL TRANSPORTATION VEHICLES

RELATED APPLICATIONS

Applicant claims the benefit of prior filed, pending U.S. Provisional Application 61/014,196. Applicant also claims the benefit, by way of a continuation-in-part, of pending U.S. application Ser. No. 11/306,978 which is the non-provisional of U.S. Provisional Application 60/593480.

FEDERALLY SPONSORED RESEARCH OR DEVELOPMENT

Not applicable.

REFERENCED OR INCORPORATED MATERIAL

The disclosure of U.S. patent application Ser. No. 11/306,978 and U.S. Provisional Patent Application 61/014196 are herein incorporated by reference into the instant application.

BACKGROUND OF INVENTION

The present invention relates to the field of security shelters for small personal transportation vehicles such as motorcycles, bicycles, and four-wheelers. Such vehicles as are stored in these shelters are quite common in the field of transportation and, furthermore, are experiencing an especially large resurgence in the United States as environmentally conscience citizens turn towards these more environmentally friendly modes of transportation. Unfortunately, the growth in this segment of transportation has been somewhat inhibited by the inherent differences between passenger automobiles and the existing infrastructure.

For instance, personal transportation vehicles, be they bicycles, motorcycles, or two wheeled Segway® scooters, are lighter weight and are more easily stolen than their passenger car cousins. In attempts to avoid theft, owners often look for a fixed immovable object that they might be able to chain or cable the vehicle to so that it can avoid being completely carried away. However, such securable stations are often few and far between and, even if one is found, the bike though locally secured, will remain otherwise open to pilfering of its contents. It is not uncommon for the personal transportation vehicle owner to return to her vehicle only to find tires missing or storage pockets pillaged.

A closely related problem concerns the exposure to the elements. While passenger cars have sealed cabins protected by roofs and windows, personal transportation vehicles are most often devoid of such protection and are, thus, left exposed even while in temporary storage. Rain, wind, and snow can take their toll on sensitive portions of these vehicles.

Until now, there has been very little in the way of efficient storage solutions for personal transportation vehicles. Certainly, for many years, owners have used various tarps and coverings to protect the vehicles from the environmental elements. Moreover, owners have built brick and mortar buildings for protected home-based security. However, each of these solutions has severe drawbacks. For instance, cloth coverings can easily be compromised by would-be thieves and brick and mortar buildings are expensive and are not portable.

One particularly innovative solution attempts to bridge the gap between simple coverings and brick and mortar buildings by creating a portable security shelter. This invention is disclosed in U.S. patent application Ser. No. 11/306,978. However, though the device does answer many of problems associated with personal transportation device storage, the invention falls short in a number of respects.

Many of the problems in the art disclosed by U.S. patent application Ser. No. 11/306,978 relate to the lid design. First, because of the "clam-shell" design, too much of the mass of the device is placed in the opening lid portion which causes the lid to be quite heavy. Thus, even with the disclosed "support cylinders" the lid can be difficult and awkward to lift. Second, the y-shaped seal configuration wherein the lid meets the base is inefficient to manufacture as it requires excess material and must be unduly precise in formation in order to function properly. Third, the vents of the lid are located on the side of the lid thus allowing dangerous fumes to collect in the void of space from the top of the vent to the top of the lid.

Other problems with the art as disclosed by U.S. patent application Ser. No. 11/306,978 relate to structural integrity of the device. In order to achieve the broad aims of its specification as it relates to structural soundness, the device of Ser. No. 11/306,978 must be made of a plastic that is unduly thick. This thickness causes increased weight which decreases portability and drastically increases the cost of production.

A final problem in the prior art disclosed by U.S. patent application Ser. No. 11/306,978 relates to the slope of the side walls, specifically the leading edge, and the front of the lid which meets the leading edge of the side walls. In that disclosure, the front of the lid and the leading edge of the side walls meet at flat, rigid corner. The height of these side walls poses problems for the user who rides her vehicle into the device because her feet must maneuver around these wall openings when mounting or dismounting the vehicle.

SUMMARY OF THE INVENTION

The present invention, thus, seeks to improve on the state of the art including U.S. patent application Ser. No. 11/306,978. Specifically, the present invention is an improved security shelter for personal transportation vehicles that is efficient to make, lightweight, portable, secure, weather resistant, safe, and user friendly.

The present invention contemplates a lightweight lid that, rather than being split along the horizontal axis as in a typical clam-shell arrangement, is hinged forward and split closer to the vertical axis when viewed from a side perspective. In this vein, the hinge is located on the top of the unit and the opening lid portion extends from the top to the bottom. This location of the lid and hinge allows for a much lighter weight lid which, in turn, allows for easier manipulation of the lid by the user.

Another aspect of the improved invention relates to the vent locations. The vents of the present invention are designed so that water cannot penetrate the louvers and, importantly, they are positioned so as to eliminate the dead space that might trap dangerous fumes or excess heat.

The seal between the lid and the top and the base is designed to be efficiently made and tightly fitting. The efficiency is produced by way of two complementary lips which meet in a downward projecting arrangement. This design facilitates manufacture of the seal out of plastic of a single thickness so as to be directly molded as part of the respective lid, top, and base. Moreover, the downward slope prevents water from entering the enclosure.

Additionally, the present invention contemplates that the walls of the base are lower in the front than those of the prior art such that the lid extends further towards the bottom of the base. Indeed, at the very front of the device where the vehicle enters, the lid touches base. This feature allows for reduced interference between the walls and the user when the user is mounting or dismounting the vehicle.

DETAILED DESCRIPTION

Figure 1:
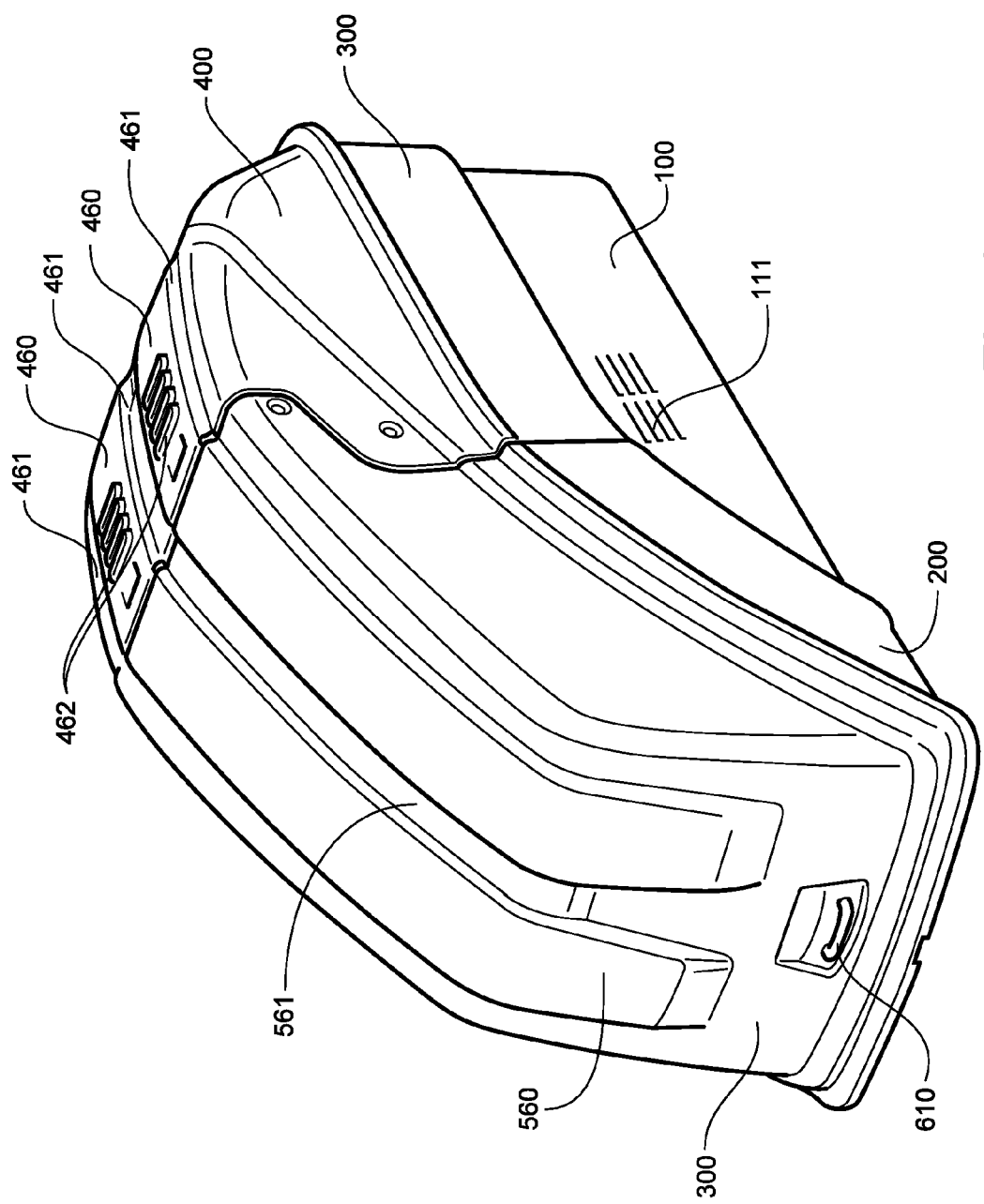
FIG. 1 is a perspective view of the security shelter showing the lid in the closed position.
Figure 2:
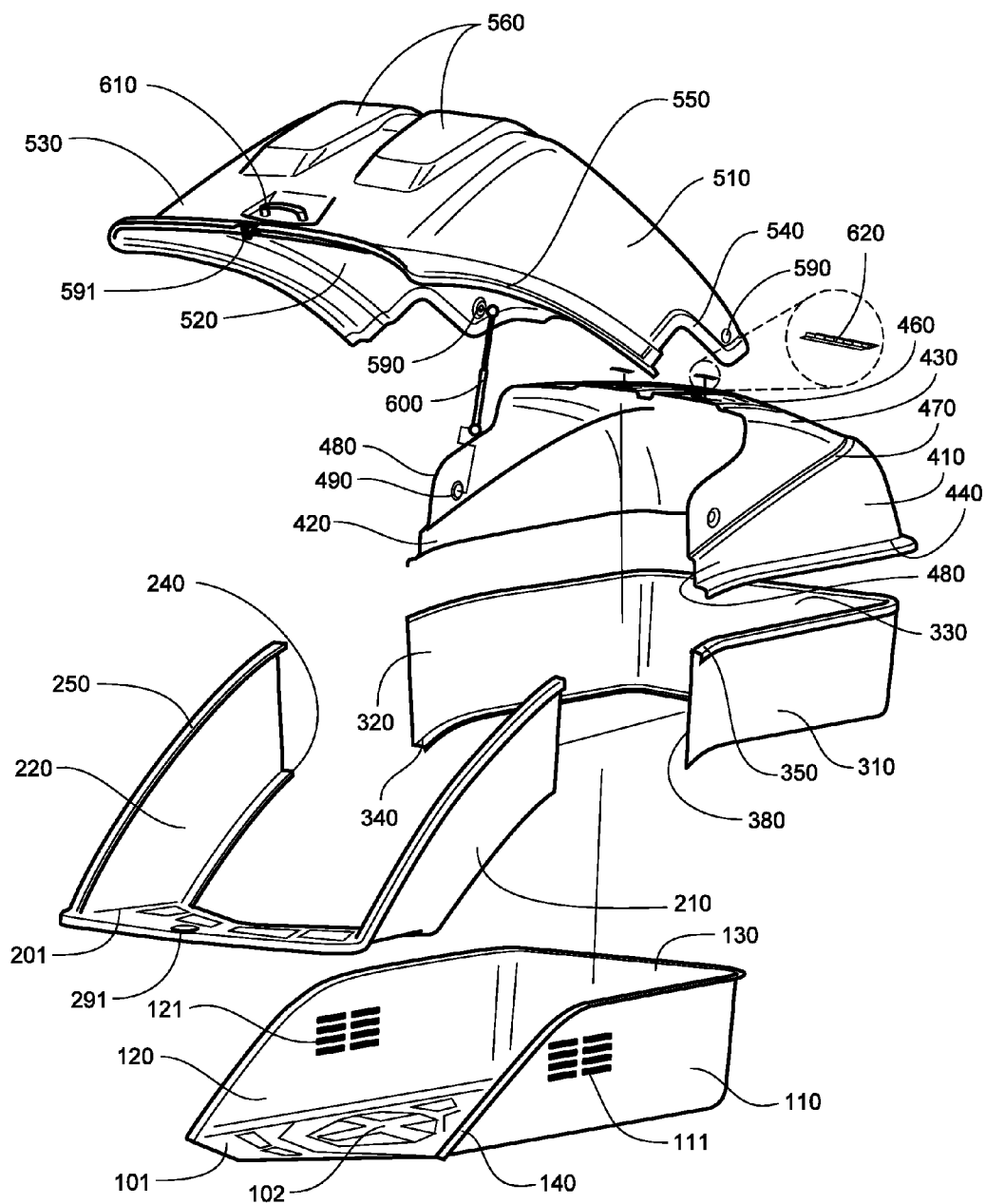
FIG. 2 is an exploded view of the security shelter showing the lid in the open position.

It is to be understood by a person having ordinary skill in the art that the present discussion is a description of exemplary embodiments only, and is not intended as limiting the broader aspects of the present invention. The following example is provided to further illustrate the invention and is not to be construed to unduly limit the scope of the invention.

The invention is characterized by its efficiency of production, its lightweight compared to the relevant prior art, its portability, its security, its weather resistance, its safety, and its general user friendliness.

The basic components include a lid (500), a top (400), a threshold (200), a mid-wall (300), and a base (100). The base (100) constitutes the foundation of the device and further comprises the floor (101), the base walls (110, 120, & 130), the side vents (111 & 121), the anchor points (640), and structural flooring ridges (102).

Figure 5:
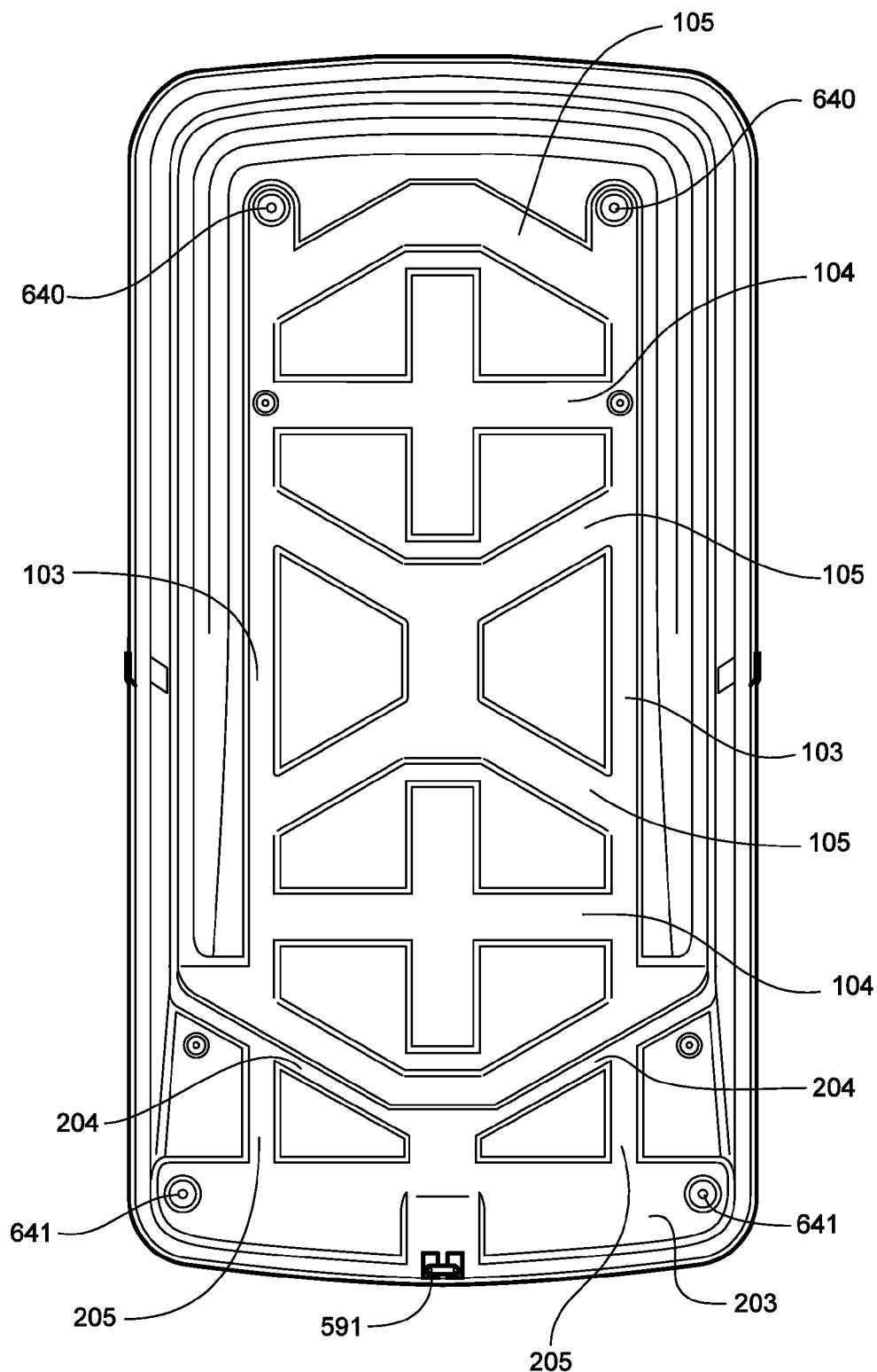
FIG. 5 is a bottom view of the security shelter showing the lid in the closed position.
Figure 6:
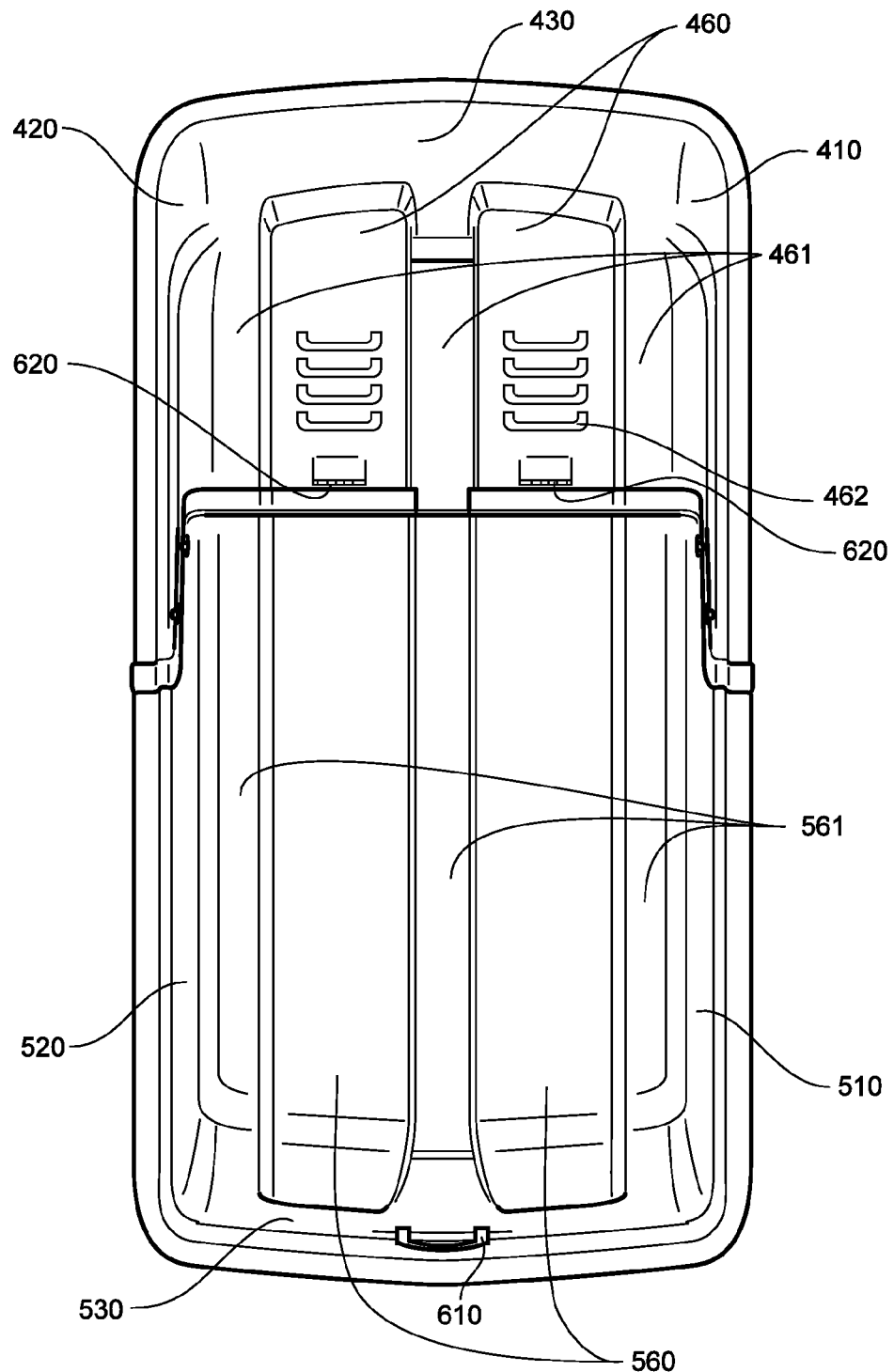
FIG. 6 is a top view of the security shelter showing the lid in the closed position.
Figure 7:
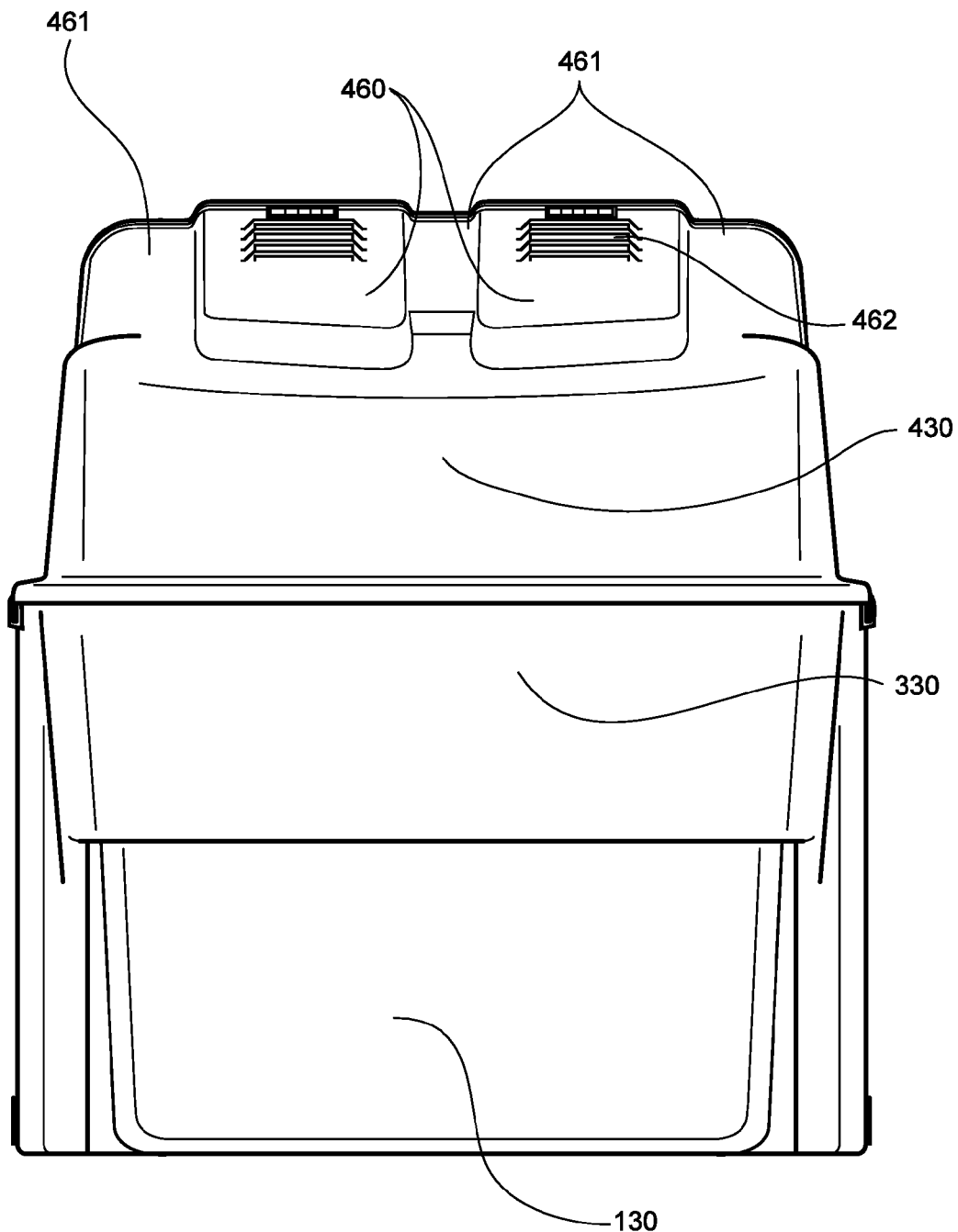
FIG. 7 is a rear view of the security shelter with the lid in the closed position.
Figure 8:
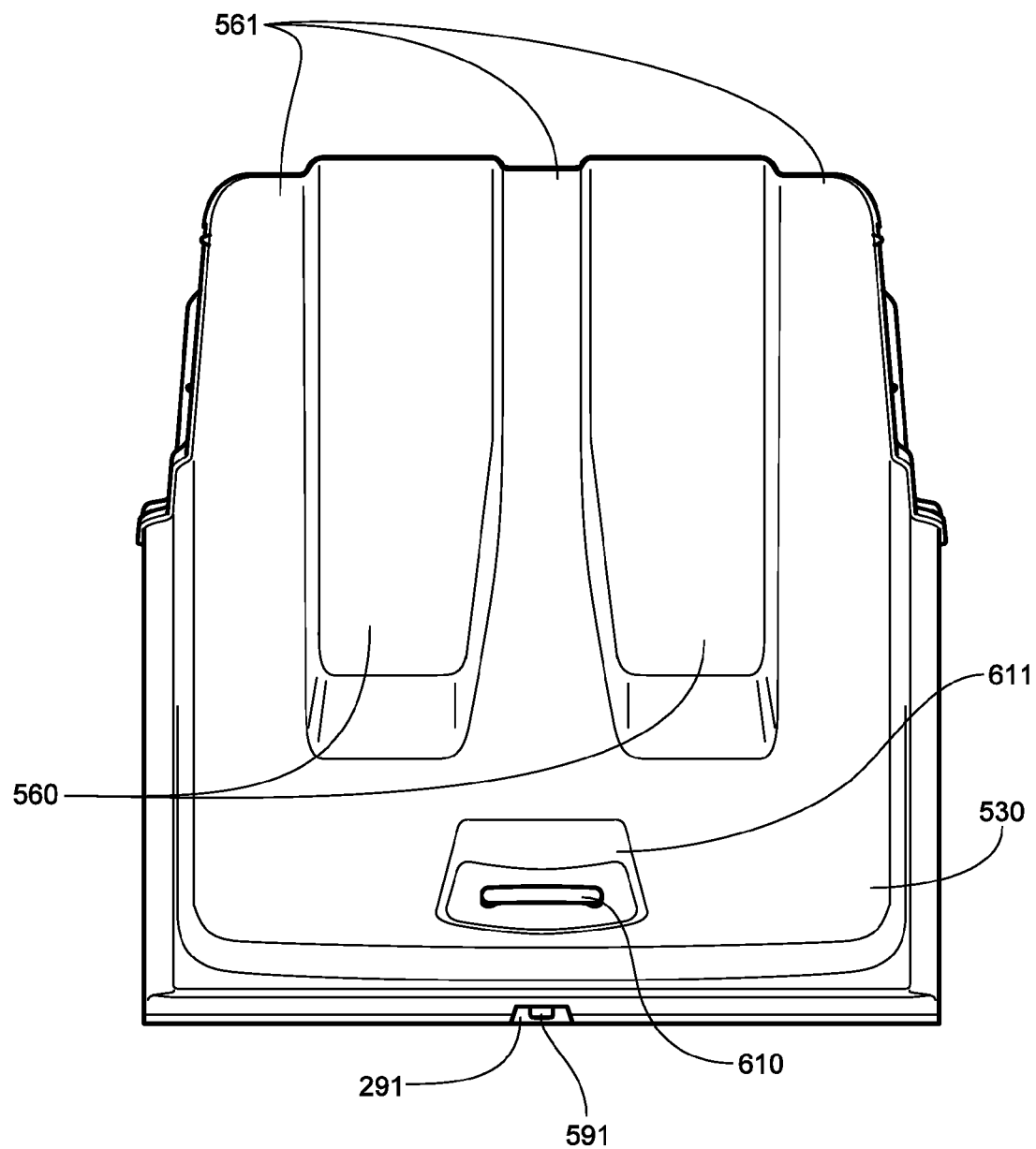
FIG. 8 is a front view of the security shelter with the lid in the closed position.

The floor of the base (101) is the surface upon which the personal transportation vehicle (630) will rest when stored in the device. The floor (101) serves the dual purpose of protecting the vehicle (630) from the elements but also protecting the outside environment from potential oil and other liquid spills. In the present embodiment, the floor (101) has a series of structural flooring ridges (102) which are molded into the plastic design. These structural ridges (102) provide support for the stored vehicle (630) as well as tension/compression from the base walls (110, 120, & 130). In one embodiment, the structural flooring ridges (102) comprise two lengthwise ridges (103) which are crisscrossed at least three points by angled ridges (105). For instance, as shown in FIG. 5 there are two uninterrupted lengthwise ridges (103). There are also two ridges (104) perpendicular to these lengthwise ridges. Also, there are a plurality of angled ridges (105) that are not perpendicular but are at an angle other than ninety degrees from the lengthwise ridges (103). In each of these flooring ridges (102), the bottom of the ridge is that portion exterior to the shelter. This bottom of the flooring ridges comes into contact with the ground or other exterior surface upon which the shelter rests. Each of these ridges (102) also has a top portion which extends downward from the generally planar surface of the remainder of the floor of the base.

Also disposed on the floor of the base are anchor points (640) wherein the user can secure the device to the floor or ground. The points allow the device to be nailed, bolted, screwed, or otherwise attached to a sub-floor for added security. Additionally, cork-screw type mounts can be used to secure the device to the earth in an outdoor setting. These anchor points (640) are preferably located within the structural flooring ridges (102).

Figure 3:
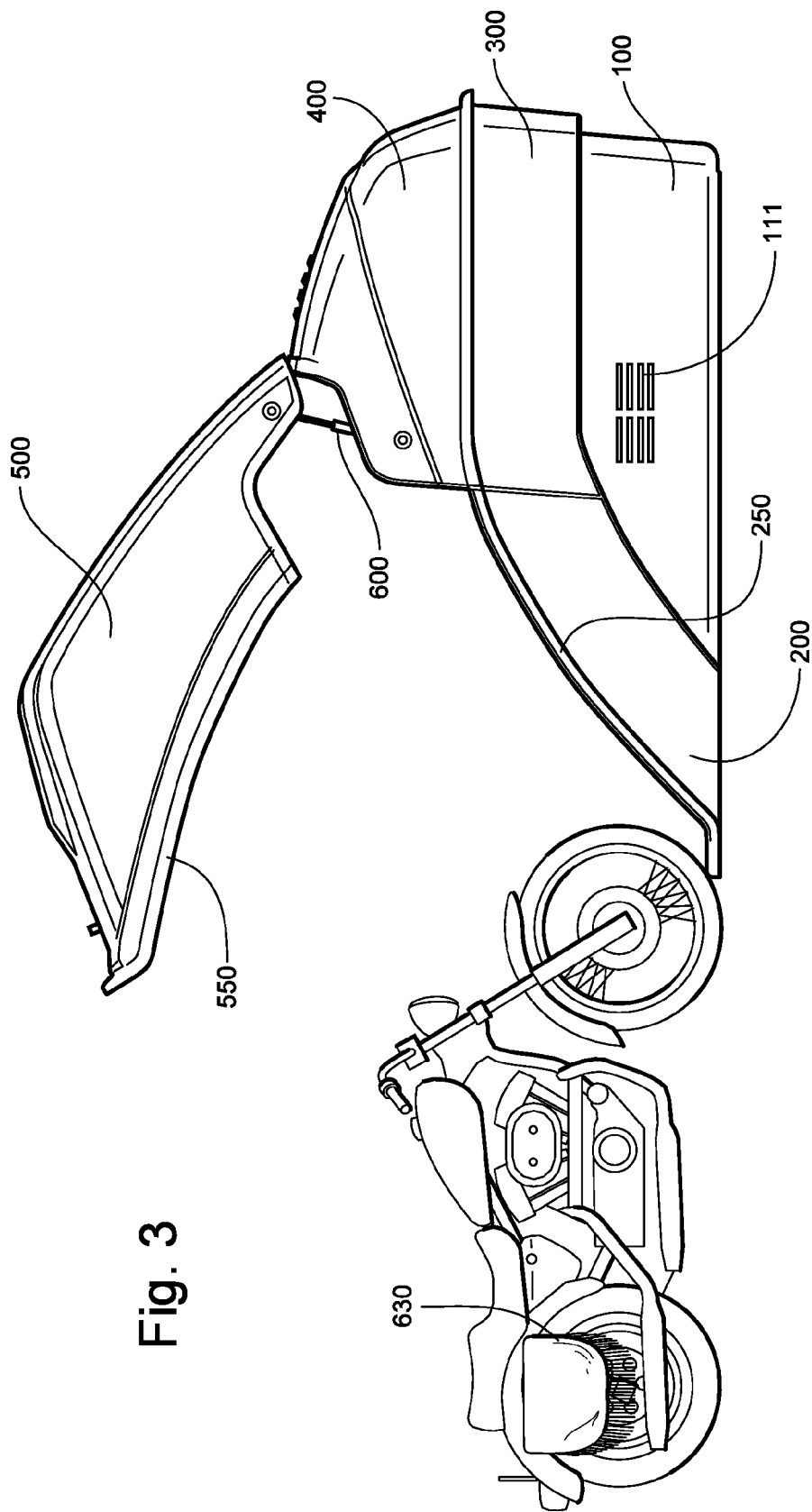
FIG. 3 is a side view of the security shelter showing the lid in the open position and highlighting how a motorcycle enters the security shelter.
Figure 4:
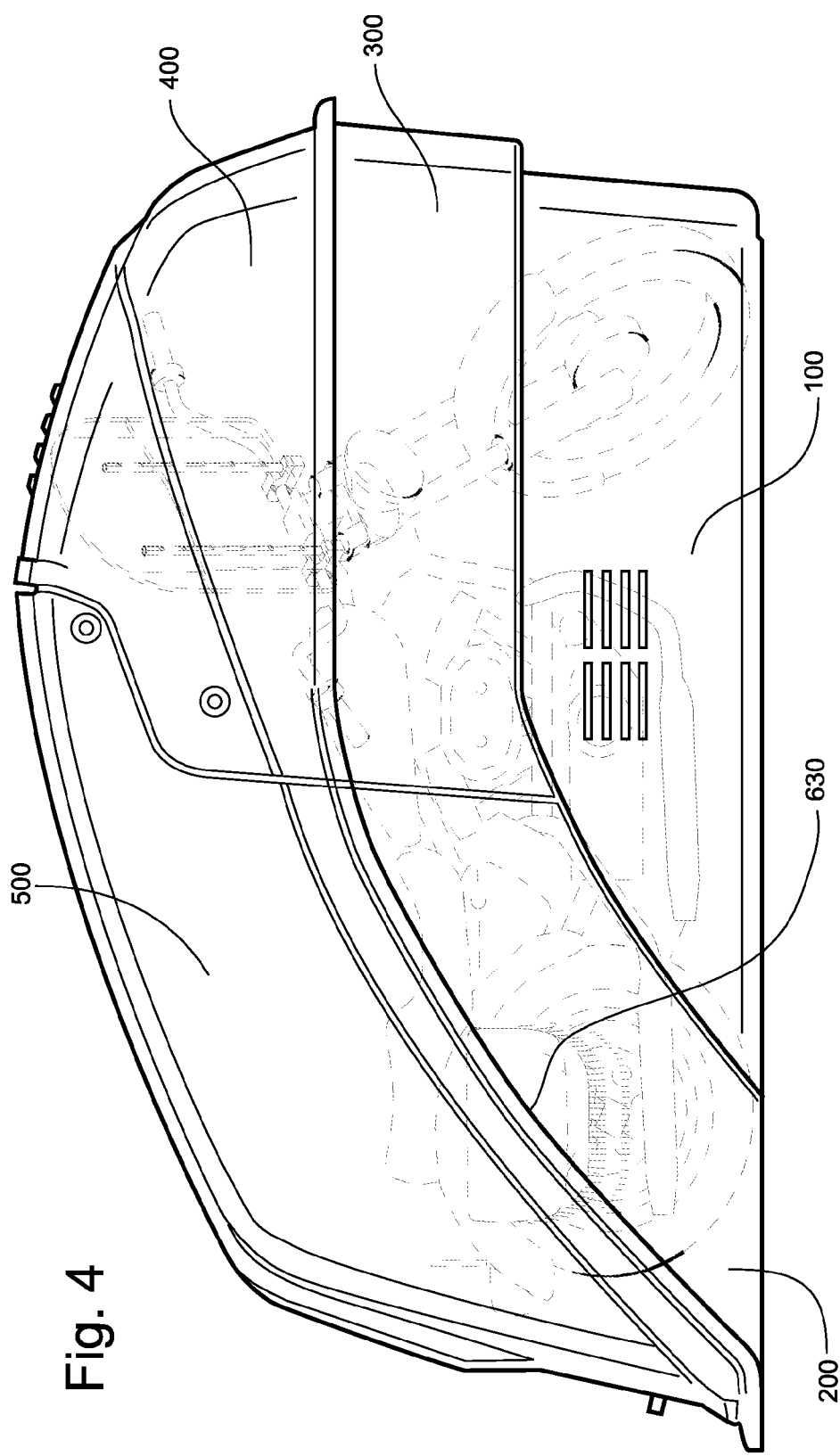
FIG. 4 is a side view of the security shelter showing the lid in the closed position and highlighting a motorcycle stowed within the security shelter.
Figure 9:
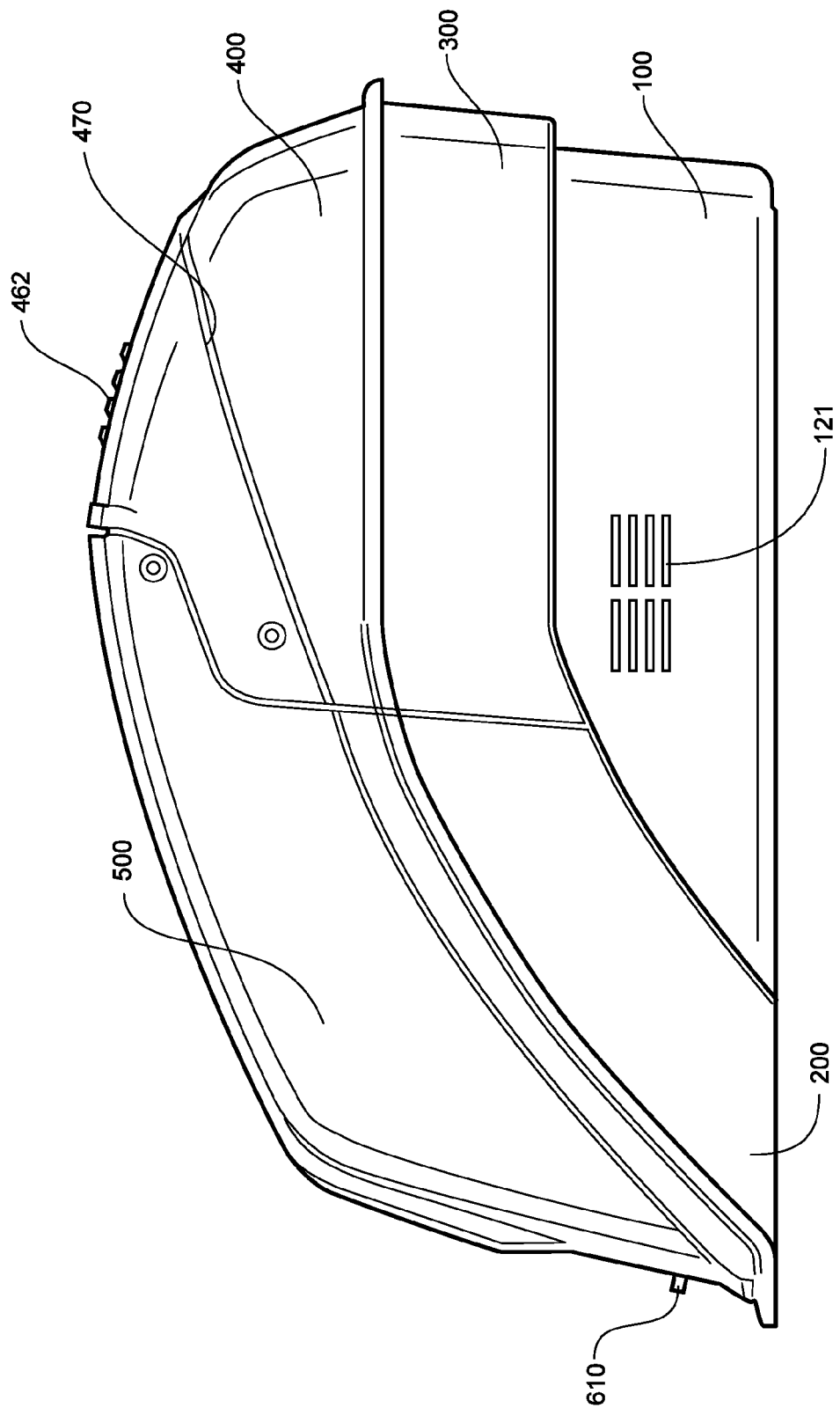
FIG. 9 is side view of the security shelter with the lid in the closed position.
Figure 10:
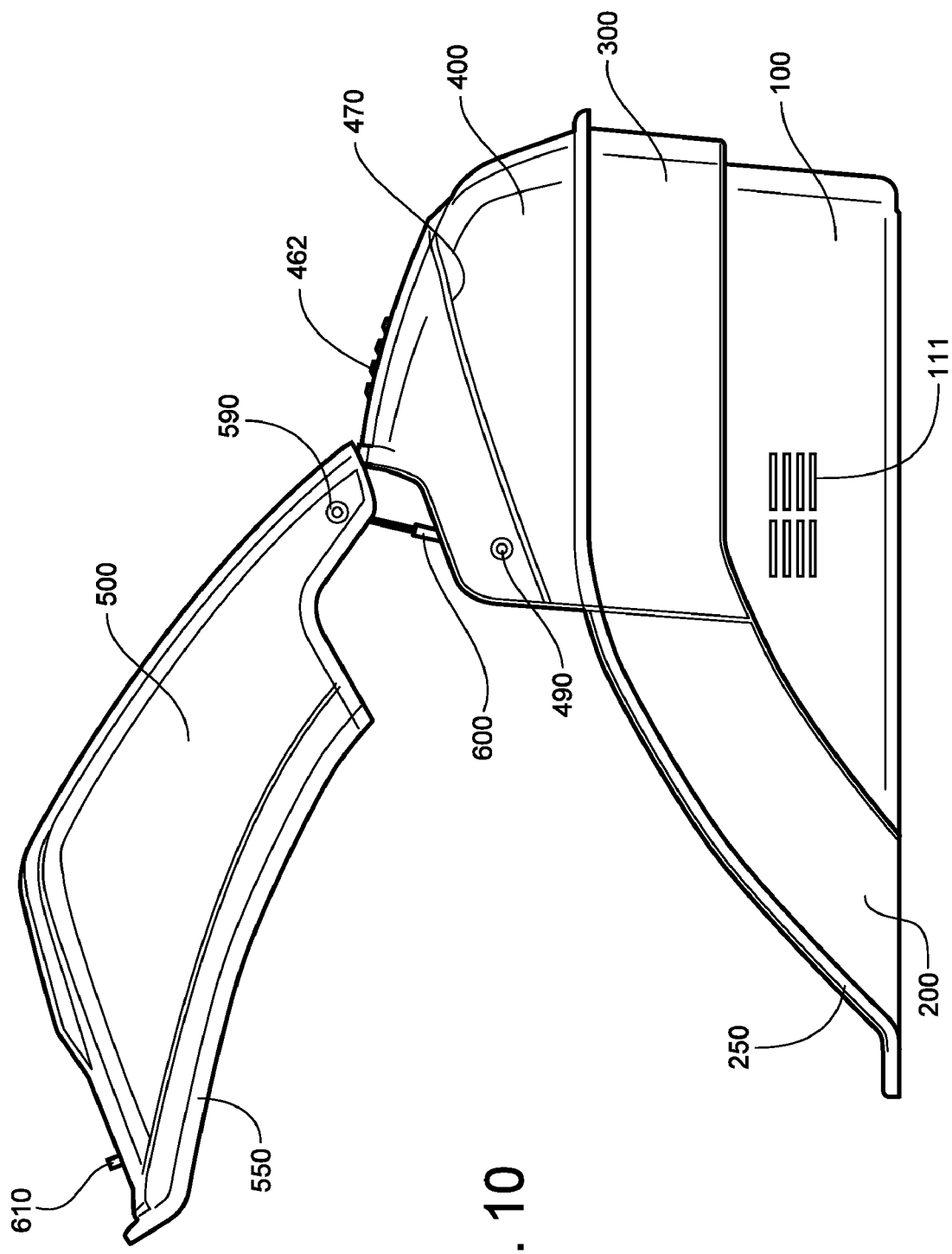
FIG. 10 is a side view of the security shelter showing the lid in the open position.

The walls (110, 120, & 130) of the base are molded directly to the floor such that the walls and the base constitute a single piece of plastic. The base walls (110, 120, & 130) have a left (120), right (110), and rear (130) portion rising from the floor (101) of the base (100). If the open ended portion of the shelter where the vehicle enters the shelter (see FIG. 3) is considered the front, the portion of the base wall opposite that opening is the rear portion (130). Likewise, the left portion (120) of the base wall is that portion to the left of the opening and the right portion (110) of the base wall is that portion to the right of the opening. These respective directions are consistent throughout the description of this embodiment. These base walls (110, 120, & 130) can have one or more vents (111 & 121) to allow vapors and heat to escape without compromising the security or the environmental soundness of the device. Preferably, these vents are in pairs (111) as shown in FIG. 9. In the vertical direction, from their lower terminus where they meet the floor to the upper end where they meet the mid-walls, the walls of the base (110, 120, & 130) rise roughly ⅓ of the overall height of the shelter. At the upper end of the base walls (110, 120, & 130), the base walls form an outward (away from the center of the shelter) flange (140) which is the point of contact with the mid-walls (300). Horizontally, at a point roughly midway between the front and rear of the shelter, the top of the left (120) and right (110) walls of the base begin to slope downward towards the front of the shelter to eventually meet with the floor (101) and the lower point of the left and right base walls. The entire length of this downward slope of the left and right base walls carries forward the outward flange (140) to form the point of contact with the threshold (200).

Fixedly attached to the base (100) is the threshold (200). The threshold (200) is fixedly attached to the floor (101) of the base and the left (120) and right (110) base walls of the base (100). Preferably this attachment is a heated glue connection to the base (100). The threshold (200) is molded from a single piece of plastic and has as a bottom portion (201) and a left (220) and right (210) side wall portion. The left (220) and right (210) sidewall portions have a lower edge portion, an upper edge portion, and a rear edge portion. The lower edge portions form an inwardly directed flange (240) that matches the outward flanges (140) of the base walls (110, 120, & 130) and forms the point of contact between the two. The upper edge portion of the sidewalls of the threshold forms a lower lip (250) which meshes with the upper lip (550) of the lid (500). This lower lip (250) extends from the uppermost point of the threshold (200) downward to the point where the upper edge of the respective side walls (210 & 220) of the threshold (200) meet the bottom (201) of the threshold (200). A front portion of the lower lip (250) connects the respective left and right portions of the lower lip and is attached to the bottom (201) of the threshold. The lower lip (250) has a generally downward projection so as to discourage the penetration of the elements into the interior. Moreover, the lower lip (250) is rather wide so that there is great amount of surface area for contact with the upper lip (550) of the lid.

The left (220) and right (210) side walls of the threshold (200) each, respectively, also attach to the mid-wall (300) at vertical edges. The left (220) and right (210) sidewalls of the threshold (200) have a vertical flange (280) that laps over the respective vertical edge (380) of the mid-wall (300). The bottom (201) of the threshold (200) is a portion of the threshold (200) that has molded structural ridges (202) that meet and coordinate with those structural flooring ridges (102) of the floor (101) of the base (100). Near the front edge of the threshold, one of the structural ridges (202) is a large ridge (203) perpendicular to the length of the shelter. From that ridge (203), two angled ridges (204) extend from the center of the large perpendicular ridge (203) to the rear edge of the threshold bottom (201), thus forming a sort of "K" shape. In the lower and upper portion of this "K" shape, a pair of ridges (205), parallel to each other, extends between the angled portions (204) of the "K" and the large perpendicular ridge (203). The threshold (200) has at least two anchor points (641), disposed on the bottom portion (201) of the threshold (200) within the large perpendicular ridge (203), that coordinate with the anchor points (640) of the base (100).

Fixedly attached to the base (100) and to the threshold (200) is the mid-wall section (300). The mid-wall section (300) is "stacked" on top of the walls (110, 120, & 130) of the base (100) and has a height that is shorter than that of the base walls (110, 120, & 130) such that when the two (100 & 300) are "stacked," the combined height of the base (100) and the mid-wall (300) is less than twice the height of the base (100) alone. The mid-wall section (300) has a left (320), right (310), and rear (330) wall, all formed from a single piece of plastic which is molded in a "U" shape. The mid-wall section (300) has a lower flange (340) located at the lower terminus end; an upper flange (350) located at its upper terminus end, and a left and right vertical edge (380) over which the threshold edges (280) lap.

The lower flange (340) of the mid-wall section (300) flanges inward and meets with the outward flanges (140) of the base walls of the base. The upper flange (350) of the mid-wall section flanges outward and meets with the inward flanges (440) of the top (400). The left and right vertical edges (380) meet with the respective vertical flange edges (280) of the threshold, said flanges (280) of the threshold lapping over the vertical edges (380) of the mid-wall section.

The top (400) is "stacked" on top of the mid-wall (300) and is fixedly attached to the mid-wall (300) with rivet connections. Screws may also be used either alone or in combination with the rivets. Likewise, a glued connection can be used in alternate embodiments. The top (400) has a length roughly equal to the length of the mid-wall section (300). The top (400) has a height that is slightly larger than the height of the base (100). The top (400) further comprises at least one vent (462) (though in the preferred embodiment there is a pair of vents), structural side ridges (470), a pair of parallel peak ridges (460), and hinge and gas spring mounts (490). The top (400), like the base (100) and mid-wall (300), has left (320), right (310), and rear (330) side walls. At the lower end of each of these walls is a flange (440) that flanges out and slightly downward to meet the flange (350) of the mid-wall. The left (420) and right (410) side walls of the top (400) fixedly attach to the left (320) and right (310) side walls of the mid-wall (300) at the respective flanges (440 & 350). The rear side wall (430) of the top (400) attaches to the rear wall (330) of the mid-wall (300) at the respective flange (440 & 350). This rear wall (430) of the top (400) slopes generally upward (with respect to base on horizontal ground) towards the front and towards the point of attachment to the lid (500).

The front edge (480) of the left (420) and right (410) side walls of the top (400) each comprise two generally vertical edges displaced by a sloped edge. These edges are lapped by a flange (540) on the lid (500).

The structural side ridges (470) lend strength to the top (400) and are primarily located on the left (420) and right (410) side walls of the top (400). These ridges (470) are molded into the design. The parallel peak ridges (460) of the top (400) are located primarily on the sloped rear wall (430) of the top (400). These parallel peak ridges (480) are associated with three coordinating linear valleys (461). These ridges (460) match up with similar ridges (560) on the lid. In the preferred embodiment, the pair of vents (462) are located within these parallel peak ridges (460) of the top (400).

The lid (500) attaches directly to the top (400) via hinges (620) on the leading edge of the upward sloping rear wall (430) of the top (400) and via gas springs (600) attached to the respective side walls (410 & 420) of the top (400). The shelter operates from an open to a closed position. The shelter is in the open position when the lid (500) is raised and the shelter is in the closed position when the lid (500) is lowered. The lid (500) has a roof wall (501), a front wall (530), and both a left (520) and a right (510) side wall. All of the walls of the lid (500) are molded together from a single piece of plastic. The edges of the walls form the upper portion of the lip (550) which seals the shelter in the closed position. This lip (550) is congruent with the lower lips (250) of the threshold (200). Thus, the upper lips (55) of the lid (500) meet the lower lips (250) of the threshold (200) to form a seal when the shelter is in the closed position.

As noted above, the lid (500) also has the structural ridges which are similar to those of the top. The parallel peak ridges (560) are located on the roof wall (501) and on the front wall (530) and run from the point of contact with the top (400) towards the point of contact with the threshold (200). Just above the lip of the front (530), left (520), and right (510) walls of the lid (500), there is a continuous perimeter structural ridge (561) molded into the respective walls.

Also disposed on the lid are a handle (610) and a locking mechanism (591). The handle (610) is located within an indentation in the front (530) wall of the lid (500). The handle (610) is centered with respect to the width of the lid (500) and located close to the bottom with respect to the height of the lid (500). The locking mechanism (591) of the lid (500) meshes with a reciprocal locking mechanism (291) disposed on the bottom of the threshold (200). In the preferred embodiment, this locking mechanism of the lid (591) is a horseshoe loop which passes through an indented hole (291) on the threshold (200) so that a lock, such as a pad lock, can be applied by the user.

In the preferred embodiment, base (100), mid-wall (300), threshold (200), top (400), and lid (500) sections are each made of molded plastic of the same thickness and composition.

We claim:
1. A storage shelter comprising:
a base, a threshold, a mid-wall, a top, and a lid; said shelter operating from an open position where said lid is raised to a closed position where said lid is lowered;
said shelter having a front end located at the end where a vehicle enters said shelter when in the open position, said shelter having a rear end opposite said front end, said shelter having a left side running between the front and rear ends, and said shelter having a right side opposite said left side;

said base, made from a single piece of molded plastic, comprising a floor, a left side wall, a right side wall, and a rear side wall, said floor having a plurality of structural flooring ridges, said plurality of structural flooring ridges comprising a pair of uninterrupted lengthwise ridges running parallel to the left and right sides of the shelter, a pair of short ridges running perpendicular to said uninterrupted lengthwise ridges, and a plurality of angled ridges that are not perpendicular but are placed at an angle other than 90 degrees from the uninterrupted lengthwise ridges, said floor further comprising a plurality of anchor points located on said uninterrupted lengthwise ridges, said left side wall having disposed thereon a first pair of vents, said right side wall having disposed thereon a second pair of vents, said left and right side walls sloping downward towards a front of the shelter, each of said left, right, and rear side walls further comprising a flange along a top edge which extends outward;

said threshold, made from a single piece of molded plastic and fixedly attached to said floor of the base and to said left and right side walls of the base, comprising a bottom portion, a left side wall portion, and a right side wall portion, said left and right side wall portions each further comprising a lower edge portion, an upper edge portion, and a vertical rear edge portion, said lower edge portion of the left and right side wall portions comprises an inwardly directed flange that matches the adjacent portion of the flange of the respective left and right side base walls thereby forming the point of contact and attachment with the base, said upper edge portion of the left and right side wall portions comprises a lower lip with a downward and outward projection which meshes with an upper lip located on the lid, said vertical rear edge portion of said left and right side wall portions of the threshold comprising an outwardly extended flange for attachment to the mid-wall, said bottom portion comprising a plurality of molded structural ridges that meet and coordinate with said plurality of structural flooring ridges of the base, said plurality of molded structural ridges of said bottom of said threshold further comprising a large ridge disposed perpendicular to the length of the shelter, a pair of angled ridges extending from the center of the large ridge to a rear edge of the bottom of the threshold, and a pair of parallel ridges extending between the large ridge and the angled ridges, and a pair of anchor points disposed within the large ridge and coordinating with the anchor points of said base, said threshold further comprising a locking mechanism bottom which comprises a secured indented hole;

said mid-wall, made from a single piece of molded plastic and having a "U" shape, fixedly attached to said base, to said top, and to said threshold, and comprising a left side wall, a right side wall, and a rear side wall, each of said left, right and rear side walls comprising a top edge and a bottom edges and each of said left and right side walls further comprising a front vertical edge, said bottom edges of said left, right, and rear side walls comprising an inwardly extending flange that meets the outwardly extending flange of the left, right, and rear side walls of the base, said top edge of said left, right, and rear side walls of said mid-wall comprising a flange that extends outward, and said front vertical edge of said left and right side walls of said mid-wall comprises a straight approximately vertical edge over which laps the flange of the vertical rear edge portion of said left and right side wall portions of the threshold;

said top, made from a single piece of molded plastic, fixedly attached to said mid-wall and hingedly attached to said lid, and comprising a left side wall, a right side wall, a sloped rear side wall, a pair of vents, structural side ridges, a pair of parallel peak ridges, and hinge and gas spring mounts, said left, right, and sloped rear side walls of said top comprising a lower edge and a front edge, said lower edge of said left, right, and sloped rear side walls of said top comprising a flange that extends outward and meets with the flange of the top edge of said left, right, and rear side walls of said mid-wall, said front edge of said sloped rear side wall of said top is uniform, said front edge of said left and right side walls each comprise a pair of nearly vertical edges displaced by a sloped edge, said left and right side walls of said top each further comprising a mount for attachment of a gas cylinder lifting mechanism, said sloped rear side wall of said top further comprising a plurality of hinge mounts for attaching a plurality of hinges, said left and right side walls of said top each further comprising a structural side ridge which is angled and slopes upward from said front edge to the point where the respective side walls of the top meet the rear wall of said top, said sloped rear side wall of said top further comprising a pair of molded parallel peak ridges and a plurality of coordinating valleys, each molded into the sloped rear side wall of said top, said front edge of said sloped rear wall matching said parallel peak ridges and coordinating valleys contour, and a pair of vents disposed on said pair of parallel peak ridges of said sloped rear side wall of said top; and said lid, made from a single piece of molded plastic, hingedly attached to said top and removably attached to said threshold when the shelter is placed in the closed position, said lid comprising a roof wall, a front side wall, a left side wall, and a right side wall, said front, left, and right side walls of said lid comprising a lower edge that slopes outward and downward to form an upper lip that congruently meshes with the lower lip of said threshold, said left and right side walls of said lid each further comprise a rear edge which extends outward, said rear edges of said left and right side walls comprising a pair of nearly vertical edges, when the shelter is in the closed position, displaced by a sloped edge, said rear edge of said left and right side walls lapping over said front edges of said left and right side walls of said top when the shelter is in the closed position; said roof wall comprising a rear edge that is nearly horizontal and extends outward and laps over said front edge of said sloped rear side wall of said top when the shelter is in the closed position, said roof wall of said lid further comprising a plurality of hinge mounts for hingedly attaching to said top, said left and right side walls of said lid each further comprising a mount for attachment of a gas cylinder lifting mechanism; said roof wall and said front side wall of said lid further comprising a pair of molded parallel peak ridges and a plurality of coordinating valleys which run from the rear edge of said roof wall of said lid downward to a point above a handle indentation located near the lower edge of said front side wall of said lid, said molded parallel peak ridges and said plurality of coordinating valleys of said lid all coordinating with said molded parallel peak ridges and said plurality of coordinating valleys of said top, said lid further comprising a handle and a locking mechanism, said handle located within said handle indentation, said locking mechanism, located at the lower edge of said front side wall and comprising a horseshoe loop made of metal which passes through the locking mechanism of said threshold.

2. The storage shelter of claim 1 wherein said base, said threshold, said mid-wall, said top, and said lid are all made from molded plastic of a uniform thickness.

3. The storage shelter of claim 2 wherein said uniform thickness is a thickness between one quarter inch and one half inch thick.

4. The storage shelter of claim 3 wherein the shelter, with respect to level ground, is defined by a total height, a total length, and a total width, said base having a height approximately one third of said total height, said mid-wall having a height less than one third total height, said top having a height more than one third total height, said base having a length less than three quarters of said total length, said mid-wall having a length approximately one half total length, said top having a length approximately one half total length, said downward slope of said left and right walls of said base beginning at a point approximately one half of said total length, and said total length is approximately twice said total width.

5. The storage shelter of claim 4 wherein said fixed attachment of said base to said mid-wall uses a riveted connection; said fixed attachment of said mid-wall to said top uses a riveted connection; said fixed attachment of said threshold to said base uses a glued connection; and said fixed attachment of said threshold to said mid-wall uses a glued connection.

6. A storage shelter comprising:
a base, a threshold, a mid-wall, a top, a lid, and a locking mechanism; said shelter operating from an open position where said lid is raised to a closed position where said lid is lowered; said shelter having a front end located at the end where a vehicle enters said shelter when in the open position, said shelter having a rear end opposite said front end, said shelter having a left side running between the front and rear ends, and said shelter having a right side opposite said left side; and wherein, with respect to a level ground, said base is positioned on the ground, said mid-wall is stacked on top of said base and fixedly attached to said base, said top is stacked on top of and is fixedly attached to said mid-wall, said threshold is fixedly attached to said base and is fixedly attached to a front edge of said mid-wall, and wherein said lid is hingedly attached to said top and removably attached to said threshold, and wherein said mid-wall is made from a single piece of molded plastic and having a "U" shape, is fixedly attached to said base, is fixedly attached to said top, and is fixedly attached to said threshold, and further comprises a left side wall, a right side wall, and a rear side wall, each of said left, right and rear side walls comprising a top edge and a bottom edge and each of said left and right side walls further comprising a front vertical edge, said bottom edges of said left, right, and rear side walls comprising an inwardly extending flange that attaches to the base, said top edge of said left, right, and rear side walls of said mid-wall comprising a flange that extends outward and attaches to the top, and said front vertical edge of said left and right side walls of said mid-wall comprises a straight approximately vertical edge which attaches to the threshold.

7. The storage shelter of claim 6 wherein said base is made from a single piece of molded plastic, comprising a floor, a left side wall, a right side wall, and a rear side wall, said floor having a plurality of structural flooring ridges, said plurality of structural flooring ridges comprising a pair of uninterrupted lengthwise ridges running parallel to the left and right sides of the shelter, a pair of short ridges running perpendicular to said uninterrupted lengthwise ridges, and a plurality of angled ridges that are not perpendicular but are placed at an angle other than 90 degrees from the uninterrupted lengthwise ridges, said floor further comprising a plurality of anchor points located on said uninterrupted lengthwise ridges, said left side wall having disposed thereon a first pair of vents, said right side wall having disposed thereon a second pair of vents, said left and right side walls sloping downward towards a front of the shelter, each of said left, right, and rear side walls further comprising a flange along a top edge which extends outward.

8. The storage shelter of claim 6 wherein said threshold is made from a single piece of molded plastic and fixedly attached to said base and further comprising a bottom portion, a left side wall portion, and a right side wall portion, said left and right side wall portions each further comprising a lower edge portion, an upper edge portion, and a vertical rear edge portion, said lower edge portion of the left and right side wall portions comprises an inwardly directed flange, said upper edge portion of the left and right side wall portions comprises a lower lip with a downward and outward projection which meshes with an upper lip located on the lid, said vertical rear edge portion of said left and right side wall portions of the threshold comprising an outwardly extended flange for attachment to the mid-wall, said bottom portion comprising a plurality of molded structural ridges, said plurality of molded structural ridges of said bottom of said threshold further comprising a large ridge disposed perpendicular to the length of the shelter, a pair of angled ridges extending from the center of the large ridge to a rear edge of the bottom of the threshold, and a pair of parallel ridges extending between the large ridge and the angled ridges, and a pair of anchor points disposed within the large ridge, said threshold further comprising a locking mechanism bottom which comprises a secured indented hole.

9. The storage shelter of claim 6 wherein said shelter is defined by a total height, a total length, and a total width, said base having a height approximately one third of said total height, said mid-wall having a height less than one third total height, said top having a height more than one third total height, said base having a length less than three quarters of said total length, said mid-wall having a length approximately one half total length, and said top having a length approximately one half total length.

10. The storage shelter of claim 6 wherein said top is made from a single piece of molded plastic, is fixedly attached to said mid-wall and is hingedly attached to said lid, and further comprises a left side wall, a right side wall, a sloped rear side wall, a pair of vents, structural side ridges, a pair of parallel peak ridges, and hinge and gas spring mounts, said left, right, and sloped rear side walls of said top comprising a lower edge and a front edge, said lower edge of said left, right, and sloped rear side walls of said top comprising a flange that extends outward and attaches to said mid-wall, said front edge of said sloped rear side wall of said top is uniform, said front edge of said left and right side walls each comprise a pair of nearly vertical edges displaced by a sloped edge, said left and right side walls of said top each further comprising a mount for attachment of a gas cylinder lifting mechanism, said sloped rear side wall of said top further comprising a plurality of hinge mounts for attaching a plurality of hinges, said left and right side walls of said top each further comprising a structural side ridge which is angled and slopes upward from said front edge to the point where the respective side walls of the top meet the rear wall of said top, said sloped rear side wall of said top further comprising a pair of molded parallel peak ridges and a plurality of coordinating valleys, each molded into the sloped rear side wall of said top, said front edge of said sloped rear matching said parallel peak ridge and coordinating valley contour; and a pair of vents disposed on said pair of parallel peak ridges of said sloped rear side wall of said top.

11. The storage shelter of claim 6 wherein said lid is made from a single piece of molded plastic, is hingedly attached to said top and is removably attached to said threshold when the shelter is placed in the closed position, said lid comprising a roof wall, a front side wall, a left side wall, and a right side wall, said front, left, and right side walls of said lid comprising a lower edge that slopes outward and downward to form an upper lip that congruently meshes with a lower lip located on said threshold, said left and right side walls of said lid each further comprising a rear edge which extends outward, said rear edges of said left and right side walls comprising a pair of nearly vertical edges, with respect to the shelter in the closed position, displaced by a sloped edge, said rear edge of said left and right side walls lapping over a pair of front edges disposed on said top when the shelter is in the closed position, said roof wall comprising a rear edge that is uniform and extends outward and laps over a front edge disposed on said top when the shelter is in the closed position, said roof wall of said lid further comprising a plurality of hinge mounts for hingedly attaching to said top, said left and right side walls of said lid each further comprising a mount for attachment of a gas cylinder lifting mechanism, said roof wall and said front side wall of said lid further comprising a pair of molded parallel peak ridges and a plurality of coordinating valleys which run from the rear edge of said roof wall of said lid downward to a point above a handle indentation located near the lower edge of said front side wall of said lid, said molded parallel peak ridges and said plurality of coordinating valleys of said lid forming a contour at said rear edge and lapping over the front edge of said top, said lid further comprising a handle and a locking mechanism, said handle located within said handle indentation, said locking mechanism, located at the lower edge of said front side wall and comprising a horseshoe loop made of metal which passes through a locking mechanism disposed on said threshold.

12. A storage shelter comprising: a base, a threshold, a mid-wall, a top, a lid, and a locking mechanism; said shelter operating from an open position where said lid is raised to a closed position where said lid is lowered; said shelter having a front end located at the end where a vehicle enters said shelter when in the open position, said shelter having a rear end opposite said front end, said shelter having a left side running between the front and rear ends, and said shelter having a right side opposite said left side; and wherein, with respect to a level ground, said base is positioned on the ground, said mid-wall is stacked on top of said base and fixedly attached to said base, said top is stacked on top of and is fixedly attached to said mid-wall, said threshold is fixedly attached to said base and is fixedly attached to a front edge of said mid-wall, and wherein said lid is hingedly attached to said top and removably attached to said threshold, and wherein said base is made from a single piece of molded plastic, comprising a floor, a left side wall, a right side wall, and a rear side wall, said floor having a plurality of structural flooring ridges, said plurality of structural flooring ridges comprising a pair of uninterrupted lengthwise ridges running parallel to the left and right sides of the shelter, a pair of short ridges running perpendicular to said uninterrupted lengthwise ridges, and a plurality of angled ridges that are not perpendicular but are placed at an angle other than 90 degrees from the uninterrupted lengthwise ridges, said floor further comprising a plurality of anchor points located on said uninterrupted lengthwise ridges, said left side wall having disposed thereon a first pair of vents, said right side wall having disposed thereon a second pair of vents, said left and right side walls sloping downward towards a front of the shelter, each of said left, right, and rear side walls further comprising a flange along a top edge which extends outward.

13. The storage shelter of claim 12 wherein said shelter is defined by a total height, a total length, and a total width, said base having a height approximately one third of said total height, said mid-wall having a height less than one third total height, said top having a height more than one third total height, said base having a length less than three quarters of said total length, said mid-wall having a length approximately one half total length, and said top having a length approximately one half total length.

14. The storage shelter of claim 13 wherein said mid-wall is made from a single piece of molded plastic and having a "U" shape, is fixedly attached to said base, is fixedly attached to said top, and is fixedly attached to said threshold, and further comprises a left side wall, a right side wall, and a rear side wall, each of said left, right and rear side walls comprising a top edge and a bottom edge and each of said left and right side walls further comprising a front vertical edge, said bottom edges of said left, right, and rear side walls comprising an inwardly extending flange that attaches to the base, said top edge of said left, right, and rear side walls of said mid-wall comprising a flange that extends outward and attaches to the top, and said front vertical edge of said left and right side walls of said mid-wall comprises a straight approximately vertical edge which attaches to the threshold.

15. The storage shelter of claim 12 wherein said threshold is made from a single piece of molded plastic and fixedly attached to said base and further comprising a bottom portion, a left side wall portion, and a right side wall portion, said left and right side wall portions each further comprising a lower edge portion, an upper edge portion, and a vertical rear edge portion, said lower edge portion of the left and right side wall portions comprises an inwardly directed flange, said upper edge portion of the left and right side wall portions comprises a lower lip with a downward and outward projection which meshes with an upper lip located on the lid, said vertical rear edge portion of said left and right side wall portions of the threshold comprising an outwardly extended flange for attachment to the mid-wall, said bottom portion comprising a plurality of molded structural ridges, said plurality of molded structural ridges of said bottom of said threshold further comprising a large ridge disposed perpendicular to the length of the shelter, a pair of angled ridges extending from the center of the large ridge to a rear edge of the bottom of the threshold, and a pair of parallel ridges extending between the large ridge and the angled ridges, and a pair of anchor points disposed within the large ridge, said threshold further comprising a locking mechanism bottom which comprises a secured indented hole.

16. The storage shelter of claim 12 wherein said top is made from a single piece of molded plastic, is fixedly attached to said mid-wall and is hingedly attached to said lid, and further comprises a left side wall, a right side wall, a sloped rear side wall, a pair of vents, structural side ridges, a pair of parallel peak ridges, and hinge and gas spring mounts, said left, right, and sloped rear side walls of said top comprising a lower edge and a front edge, said lower edge of said left, right, and sloped rear side walls of said top comprising a flange that extends outward and attaches to said mid-wall, said front edge of said sloped rear side wall of said top is uniform, said front edge of said left and right side walls each comprise a pair of nearly vertical edges displaced by a sloped edge, said left and right side walls of said top each further comprising a mount for attachment of a gas cylinder lifting mechanism, said sloped rear side wall of said top further comprising a plurality of hinge mounts for attaching a plurality of hinges, said left and right side walls of said top each further comprising a structural side ridge which is angled and slopes upward from said front edge to the point where the respective side walls of the top meet the rear wall of said top, said sloped rear side wall of said top further comprising a pair of molded parallel peak ridges and a plurality of coordinating valleys, each molded into the sloped rear side wall of said top, said front edge of said sloped rear matching said parallel peak ridge and coordinating valley contour; and a pair of vents disposed on said pair of parallel peak ridges of said sloped rear side wall of said top.

17. The storage shelter of claim 12 wherein said lid is made from a single piece of molded plastic, is hingedly attached to said top and is removably attached to said threshold when the shelter is placed in the closed position, said lid comprising a roof wall, a front side wall, a left side wall, and a right side wall, said front, left, and right side walls of said lid comprising a lower edge that slopes outward and downward to form an upper lip that congruently meshes with a lower lip located on said threshold, said left and right side walls of said lid each further comprising a rear edge which extends outward, said rear edges of said left and right side walls comprising a pair of nearly vertical edges, with respect to the shelter in the closed position, displaced by a sloped edge, said rear edge of said left and right side walls lapping over a pair of front edges disposed on said top when the shelter is in the closed position, said roof wall comprising a rear edge that is uniform and extends outward and laps over a front edge disposed on said top when the shelter is in the closed position, said roof wall of said lid further comprising a plurality of hinge mounts for hingedly attaching to said top, said left and right side walls of said lid each further comprising a mount for attachment of a gas cylinder lifting mechanism, said roof wall and said front side wall of said lid further comprising a pair of molded parallel peak ridges and a plurality of coordinating valleys which run from the rear edge of said roof wall of said lid downward to a point above a handle indentation located near the lower edge of said front side wall of said lid, said molded parallel peak ridges and said plurality of coordinating valleys of said lid forming a contour at said rear edge and lapping over the front edge of said top, said lid further comprising a handle and a locking mechanism, said handle located within said handle indentation, said locking mechanism, located at the lower edge of said front side wall and comprising a horseshoe loop made of metal which passes through a locking mechanism disposed on said threshold.

\* \* \* \* \*